(12) United States Patent
Murtha

(10) Patent No.: US 11,174,620 B2
(45) Date of Patent: *Nov. 16, 2021

(54) EXCAVATOR

(71) Applicant: Donald Murtha, Conneaut, OH (US)

(72) Inventor: Donald Murtha, Conneaut, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 15/443,767

(22) Filed: Feb. 27, 2017

(65) Prior Publication Data

US 2017/0167110 A1 Jun. 15, 2017

Related U.S. Application Data

(63) Continuation of application No. 14/222,041, filed on Mar. 21, 2014, now Pat. No. 9,617,711.

(51) Int. Cl.
| | |
|---|---|
| *E02F 3/96* | (2006.01) |
| *E02F 3/76* | (2006.01) |
| *E02F 7/04* | (2006.01) |
| *E02F 9/16* | (2006.01) |
| *B60P 1/04* | (2006.01) |
| *E02F 3/32* | (2006.01) |

(52) U.S. Cl.
CPC ............ *E02F 3/964* (2013.01); *B60P 1/04* (2013.01); *E02F 3/32* (2013.01); *E02F 3/7627* (2013.01); *E02F 3/7631* (2013.01); *E02F 7/04* (2013.01); *E02F 9/166* (2013.01)

(58) Field of Classification Search
CPC ..... B60G 5/00; B60G 2200/318; E02F 9/121; E02F 9/08; E02F 9/166; E02F 3/964; E02F 3/32; E02F 3/7627; E02F 3/7631; E02F 7/04; B60P 1/04

See application file for complete search history.

(56) References Cited

U.S. PATENT DOCUMENTS

| | | | |
|---|---|---|---|
| 2,295,769 A | 9/1942 | Zeilman | |
| 2,405,981 A | 8/1946 | Schield | |
| 2,472,726 A | 6/1949 | Russell | |
| 2,828,868 A * | 4/1958 | Odoran | .......... B66C 23/78 |
| | | | 212/303 |

(Continued)

FOREIGN PATENT DOCUMENTS

| | | |
|---|---|---|
| IE | S20000812 A2 | 4/2001 |
| JP | 10-159132 A | 6/1998 |

(Continued)

OTHER PUBLICATIONS

International Search Report for corresponding International Application No. PCT/US2015/021718; dated Sep. 11, 2015.

(Continued)

*Primary Examiner* — Jamie L McGowan
(74) *Attorney, Agent, or Firm* — Curatolo Sidoti Co., LPA; Salvatore A. Sidoti; Brittany L. Kulwicki

(57) ABSTRACT

An excavator for earthmoving and construction includes a main frame, a rotatable cabin mounted on top of the main frame, a boom, a stick, a digging bucket, and a slidable plate assembly attached to the main frame that is capable of distributing the weight of the rotatable operator's cabin. The excavator optionally includes a removable dump bed mounted to the main frame for receiving material from the digging bucket.

9 Claims, 17 Drawing Sheets

(56) References Cited

U.S. PATENT DOCUMENTS

| | | | | |
|---|---|---|---|---|
| 2,857,065 A | * | 10/1958 | Ferwerda | E02F 3/286 |
| | | | | 37/379 |
| 3,099,098 A | * | 7/1963 | Davis | B60P 1/045 |
| | | | | 172/666 |
| 3,190,384 A | * | 6/1965 | Dufresne | B62D 49/0635 |
| | | | | 180/6.7 |
| 3,235,985 A | | 2/1966 | Lauster | |
| 3,430,790 A | * | 3/1969 | Osmano | B62D 49/08 |
| | | | | 180/41 |
| 3,433,374 A | * | 3/1969 | Menzi | E02F 3/30 |
| | | | | 414/694 |
| 3,447,621 A | * | 6/1969 | Schoonover | B62D 55/07 |
| | | | | 180/9.52 |
| 3,466,770 A | * | 9/1969 | Morrison | E02F 3/30 |
| | | | | 172/823 |
| 3,625,381 A | * | 12/1971 | Menzi | B60B 35/1027 |
| | | | | 280/638 |
| 3,703,973 A | * | 11/1972 | Nilsson | B66C 13/18 |
| | | | | 414/694 |
| 3,963,132 A | | 6/1976 | Dufour | |
| 4,064,956 A | * | 12/1977 | Wildey | B60G 5/02 |
| | | | | 180/24.05 |
| 4,222,186 A | | 9/1980 | Molby | |
| 4,501,334 A | | 2/1985 | Ptacek | |
| 4,519,468 A | | 5/1985 | Mick | |
| 4,679,803 A | | 7/1987 | Biller et al. | |
| 4,736,532 A | | 4/1988 | Jensen | |
| 4,763,742 A | * | 8/1988 | Langford | A01G 23/081 |
| | | | | 144/34.5 |
| 4,823,852 A | * | 4/1989 | Langford | A01G 23/081 |
| | | | | 144/4.1 |
| 4,881,865 A | * | 11/1989 | Herolf | B60P 1/5433 |
| | | | | 144/336 |
| 4,984,961 A | * | 1/1991 | Herolf | A01G 23/006 |
| | | | | 144/256.1 |
| 5,076,378 A | * | 12/1991 | Lagace | B60G 5/00 |
| | | | | 180/6.7 |
| 5,246,246 A | * | 9/1993 | Kendall | B62D 55/30 |
| | | | | 180/9.26 |
| 5,308,216 A | * | 5/1994 | Herolf | A01G 23/006 |
| | | | | 180/209 |
| 5,655,615 A | * | 8/1997 | Mick | B60G 5/02 |
| | | | | 180/24.02 |
| 5,782,538 A | * | 7/1998 | Backs | B60G 5/03 |
| | | | | 298/17.5 |
| 6,024,232 A | | 2/2000 | Helgesson | |
| 6,132,131 A | * | 10/2000 | Nakamura | E02F 3/3618 |
| | | | | 37/468 |
| 6,502,333 B1 | * | 1/2003 | Striegel | B07B 1/005 |
| | | | | 37/142.5 |
| 7,640,996 B2 | | 1/2010 | Moyna | |
| 7,739,813 B2 | * | 6/2010 | Beaton | B66C 23/701 |
| | | | | 37/347 |
| 7,954,524 B2 | * | 6/2011 | Voermans | A01G 23/095 |
| | | | | 144/24.13 |
| 7,975,944 B2 | * | 7/2011 | Ramun | E02F 3/302 |
| | | | | 144/34.1 |
| 8,024,875 B2 | * | 9/2011 | Wetzel | E02F 3/325 |
| | | | | 37/403 |
| 8,490,663 B2 | * | 7/2013 | Wright | A01G 3/08 |
| | | | | 144/4.1 |
| 2004/0026900 A1 | * | 2/2004 | English | B60G 5/02 |
| | | | | 280/677 |
| 2004/0217628 A1 | | 11/2004 | Neunteufel et al. | |
| 2005/0102866 A1 | | 5/2005 | Sewell et al. | |
| 2005/0110242 A1 | * | 5/2005 | Ziech | B60G 5/053 |
| | | | | 280/677 |
| 2006/0202514 A1 | | 9/2006 | Antonetti | |
| 2008/0164664 A1 | | 7/2008 | Anderson et al. | |
| 2008/0289227 A1 | * | 11/2008 | McKee | E02F 3/28 |
| | | | | 37/410 |
| 2009/0038186 A1 | | 2/2009 | Osswald et al. | |
| 2009/0044434 A1 | * | 2/2009 | Breuer | E02F 3/7613 |
| | | | | 37/410 |
| 2009/0196722 A1 | * | 8/2009 | Anderson | B60G 17/005 |
| | | | | 414/482 |
| 2010/0244422 A1 | | 9/2010 | Sugimoto | |
| 2011/0114410 A1 | * | 5/2011 | Sergison | B60G 5/02 |
| | | | | 180/291 |
| 2013/0298796 A1 | | 11/2013 | Legard | |
| 2014/0193231 A1 | | 7/2014 | Yrjänä et al. | |
| 2015/0267378 A1 | | 9/2015 | Murtha | |
| 2016/0362149 A1 | * | 12/2016 | Erlinger | B60G 1/04 |

FOREIGN PATENT DOCUMENTS

| | | |
|---|---|---|
| KR | 10-2014-0024765 | 3/2014 |
| WO | WO 03/068583 A1 | 8/2003 |
| WO | WO 2012-135242 A2 | 10/2012 |

OTHER PUBLICATIONS

Written Opinion for corresponding International Application No. PCT/US2015/021718; dated Sep. 11, 2015.

Extended European Search Report in EP 1576778.5, dated Jan. 30, 2018.

Office Action for corresponding Canadian Patent Application No. 2,980,543 dated Apr. 12, 2021.

Office Action for corresponding European Patent Application No. 15764778.5 dated May 4, 2021.

* cited by examiner

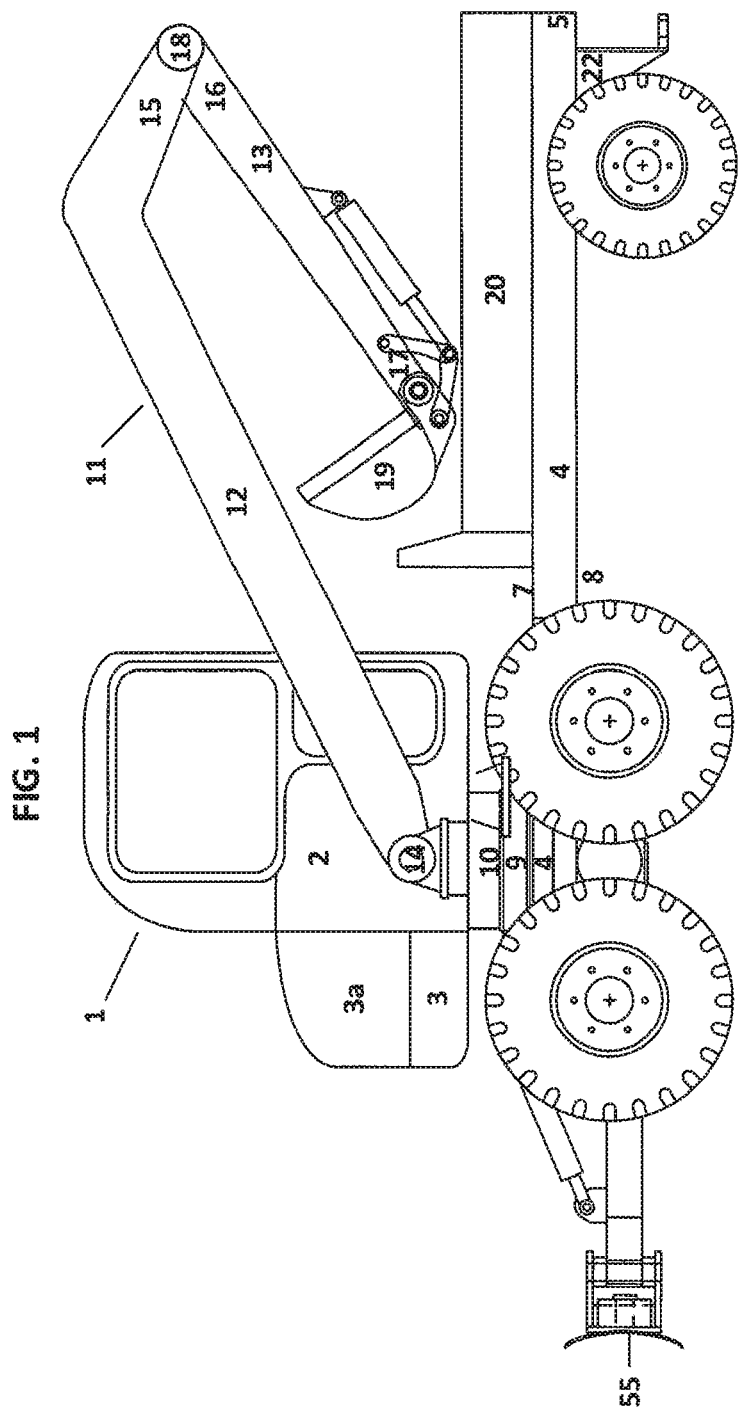

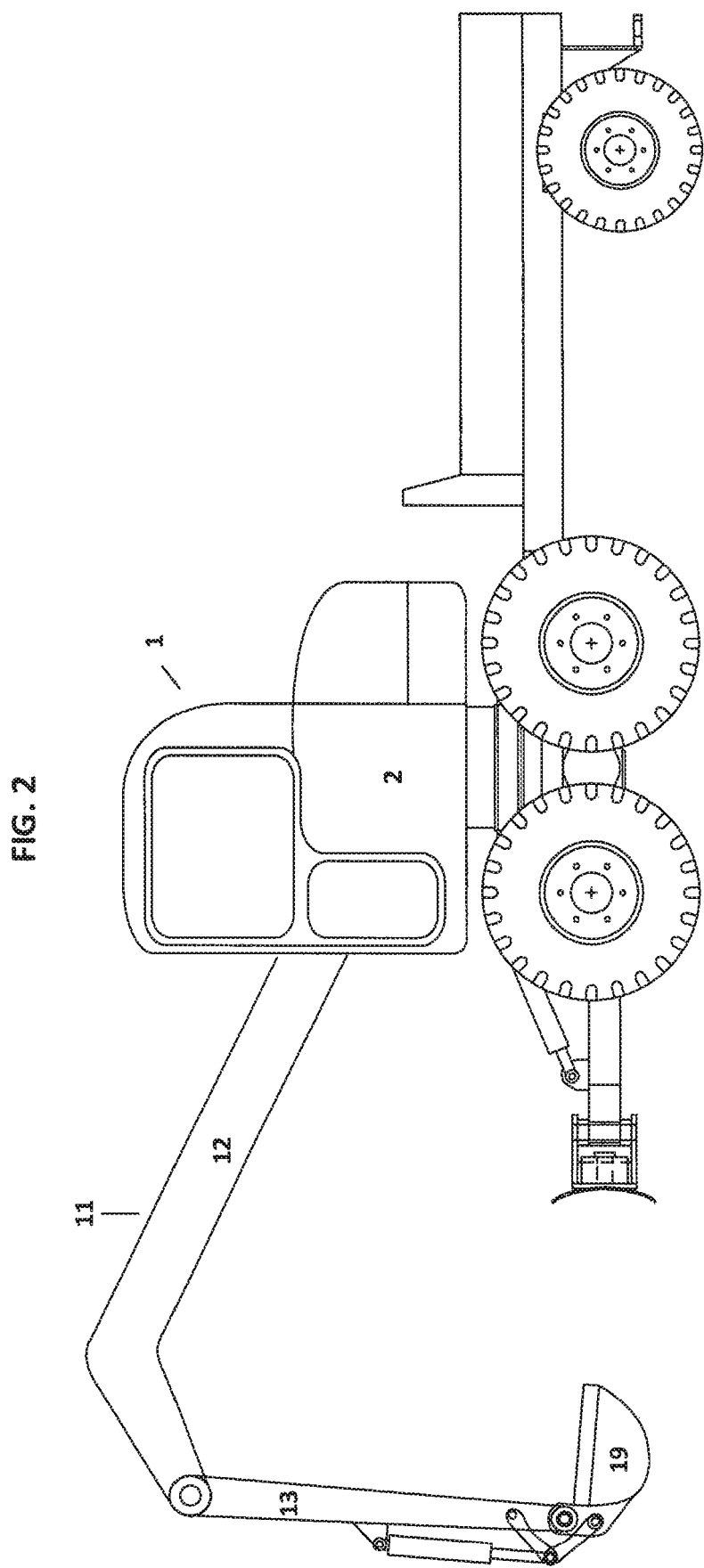

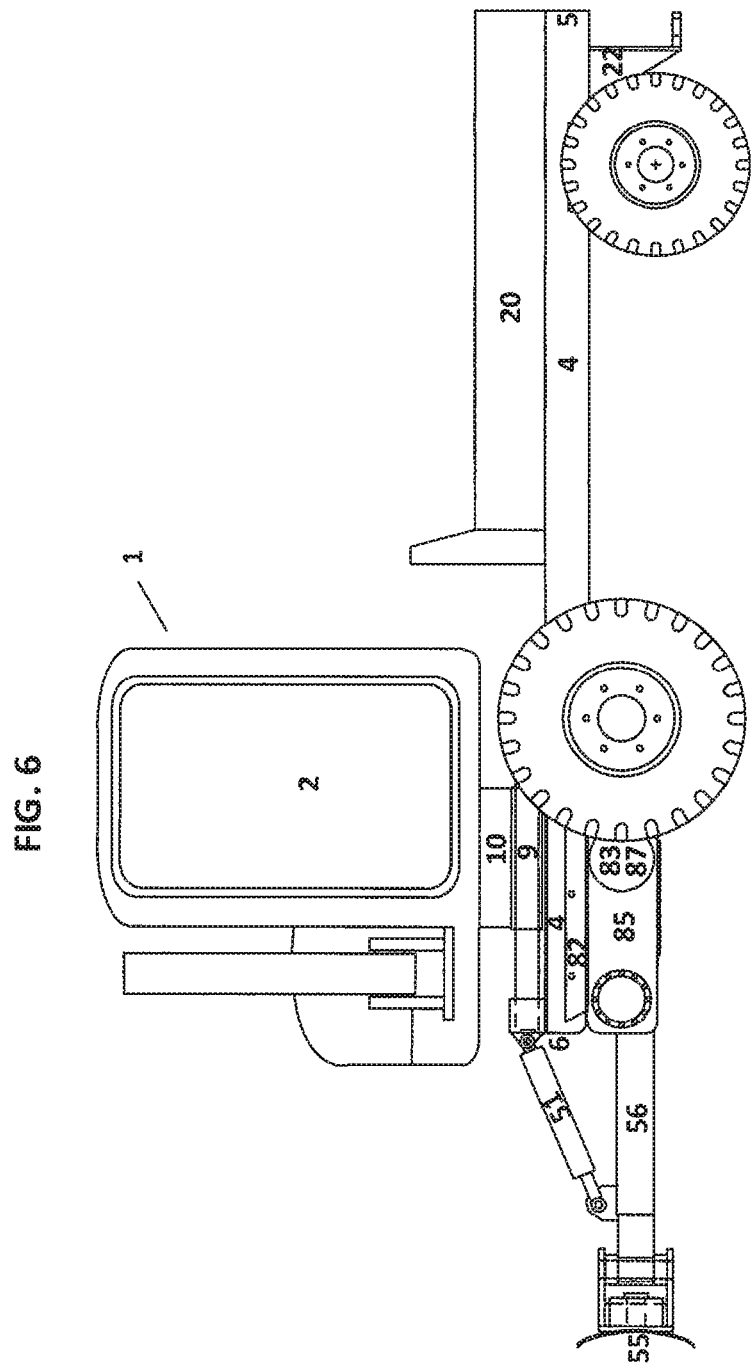

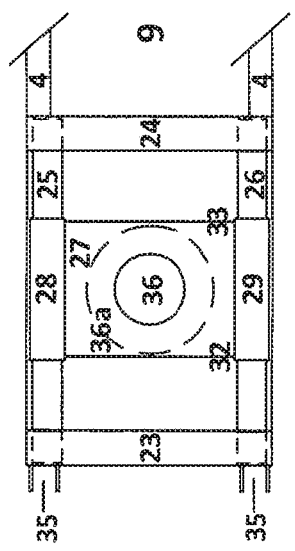
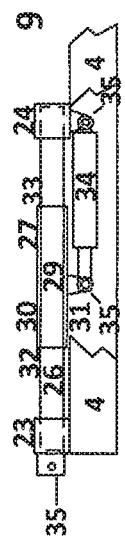
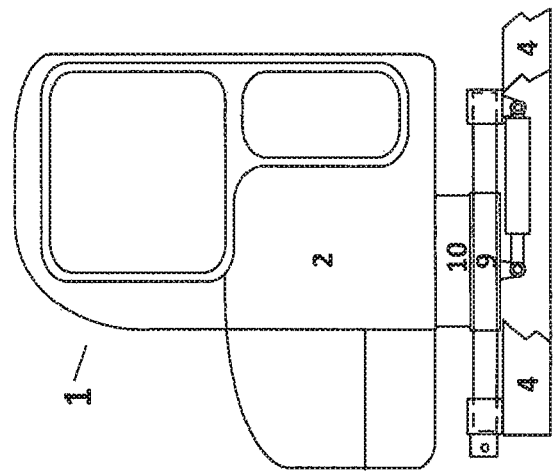
FIG. 7A
FIG. 7B
FIG. 7C

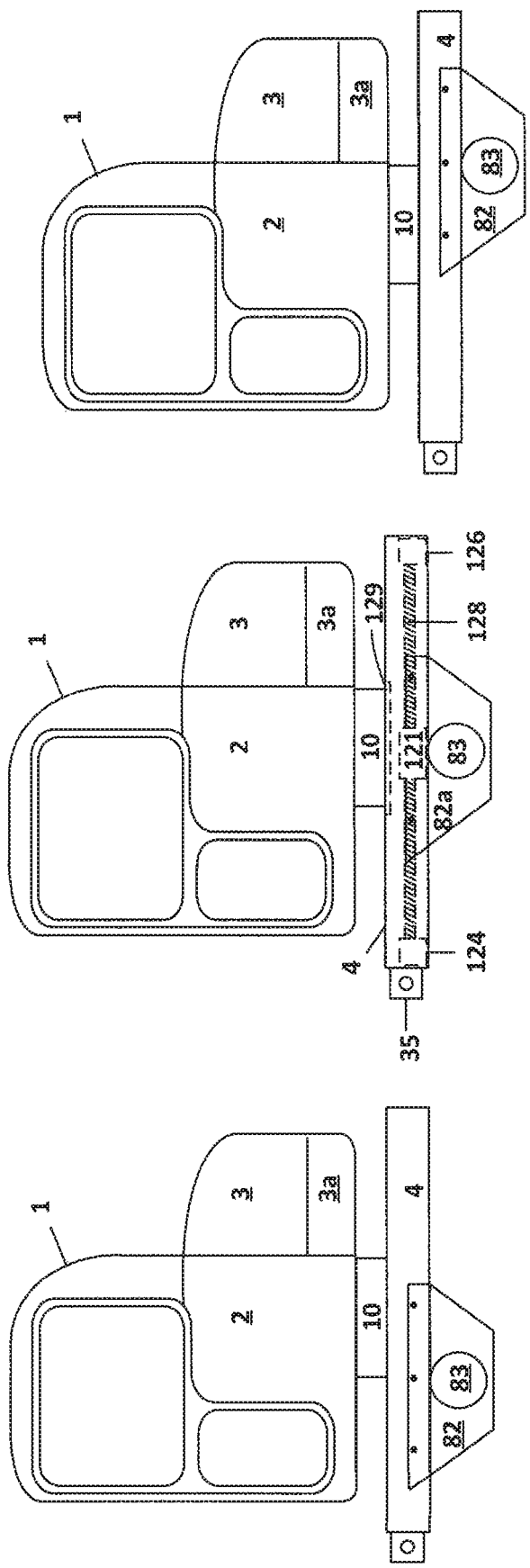

EXCAVATOR

TECHNICAL FIELD

The present disclosure relates to earthmoving construction equipment. The present disclosure more particularly relates to excavators for use in construction.

BACKGROUND

Excavators are heavy earthmoving construction equipment. Excavators are generally comprised of a frame with tracks or wheels, an operator's cabin that is mounted on the top of the frame, a digging arm which consists of a boom portion and a stick portion, and a digging bucket attached to the stick portion of the digging arm. Both the operator's cabin and the digging arm are able to rotate 360° in a horizontal plane. The movements of the various components of the excavator are controlled through the use of hydraulic rams and hydraulic fluid.

Excavators have the function of digging into the earth. An operator's cabin and digging arm are mounted on a rotatable base. A counterweight is also mounted on the rotatable base. The rotatable base is mounted onto a self-propelled mobile (wheels or track system) frame. While the operator's cabin and the digging arm are capable of revolving 360° in a horizontal plane, neither are capable of moving forward or backward independently of the underlying frame (chassis) of the excavator.

SUMMARY

Disclosed is an excavator comprising a main frame having a longitudinal axis; a slidable plate slidably mounted on said main frame, wherein said slidable plate is slidable along a portion of said longitudinal axis of said main frame; a cabin rotatably mounted on the top of said slidable plate; an articulated digging arm; and optionally a bucket removably connected to said articulated digging arm.

According to certain illustrative embodiments, the excavator comprises a main frame; a second frame mounted on said main frame; a slidable plate slidably mounted on said second frame; a cabin rotatably mounted on said slidable plate; an articulated digging arm rotatably mounted on said slidable plate; and optionally a bucket removably connected to said articulated digging arm.

According to certain illustrative embodiments, the excavator comprises a main frame; a second frame mounted on said main frame; a slidable plate slidably mounted on said second frame; a rotatable base mounted on said slidable plate; a cabin mounted on said rotatable base; an articulated digging arm mounted on said rotatable base; optionally a bucket removably connected to said articulated digging arm.

According to certain illustrative embodiments, the excavator comprises a main frame; a second frame mounted to said main frame; a reciprocally movable plate mounted to said second frame; a rotatable base mounted on said reciprocally movable plate; a cabin mounted on said rotatable base; and a digging arm mounted on said rotatable base.

According to certain illustrative embodiments, the excavator comprises a main frame having a longitudinal axis; a rotatable base mounted on main frame; a cabin mounted on said rotatable base; an axle-walking beam assembly movably mounted below said main frame; means for reciprocally moving said axle-walking beam assembly in the longitudinal axis of said main frame; an articulated digging arm; and optionally a bucket removably connected to said articulated digging arm.

BRIEF DESCRIPTION OF DRAWINGS

FIG. 1 is a side view of an illustrative embodiment of the excavator with the digging arm resting in a removable dump bed.

FIG. 2 is another side view of the illustrative embodiment of the excavator of FIG. 1 with the digging arm resting on the ground.

FIG. 6 is a side view of the illustrative embodiment of the excavator shown in FIG. 1 with the operator's cabin rotated to face in the direction of one longitudinal side of the excavator.

FIG. 7A is a top plan view of the second frame, of the excavator, which may also be referred to herein as the sliding plate frame, or weight slide frame.

FIG. 7B is a side view of the second frame engaged with the main frame of the excavator.

FIG. 7C is a side view of the operator's cabin of the excavator mounted on the rotatable base, second frame, and main frame.

FIG. 18A-18C are partial side views of an illustrative embodiment of the excavator with the operator's cabin mounted on the main frame of the excavator with the movable tandem axle-walking beam assembly positioned in different positions along the longitudinal axis of the main frame.

DETAILED DESCRIPTION

Figure 4:
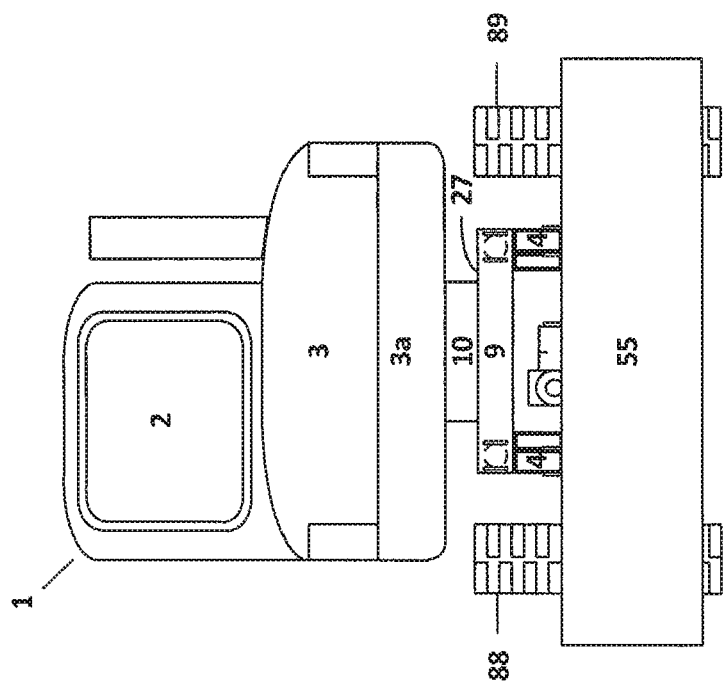
FIG. 4 is a rear view of the illustrative embodiment of the excavator shown in FIG. 1.

Disclosed is a hydraulic excavator for construction. The excavator comprises an elongated main frame having opposite front and rear ends and spaced apart longitudinal sides. A plate is slidably engaged on top of the main frame and is capable of sliding forward and backward in the longitudinal direction of the main frame. An operator's cabin is rotatably connected to the slidable plate and permits the cabin to rotate 360° in a horizontal plane about the excavator. The excavator further includes an articulated digging arm for digging into the earth. Like the operator's cabin, the articulated digging arm is capable of rotating 360° about the excavator. A bucket or scoop for digging into the earth or for scooping up material resting on the earth is removably connected to the end of the articulated arm of the excavator.

According to certain illustrative embodiments, the excavator comprises an elongated main frame having opposite front and rear ends and spaced apart elongated longitudinal axis. A plate is slidably engaged with top of the main frame and is capable of sliding forward and backward in the longitudinal direction of the main frame. An operator's cabin is rotatably connected to the slidable plate and permits the cabin to rotate 360° about the excavator. The excavator further includes an articulated arm for digging into the earth. Like the cabin, the articulated digging arm is capable of rotating 360° about the excavator. A bucket or scoop is removably connected to the end of the articulated arm of the excavator. According to this embodiment, the excavator also includes a removable dump bed for receiving material from the bucket of the excavator. The dump bed is releasable or otherwise removably connected to the top of the main frame.

According to other illustrative embodiments, the excavator comprises an elongated main frame having opposite top and bottom surfaces, opposite front and rear ends, and spaced apart elongated longitudinal sides. A second frame is fixedly mounted on the top of the main frame of the excavator. A plate is slidably engaged with the second frame and is capable of sliding forward and backward in the longitudinal direction of the main frame. An operator's cabin is rotatably mounted on the top of the slidable plate and permits the cabin to rotate 360° about the excavator. The excavator further includes an articulated arm for digging into the earth. The articulated arm is connected to the rotatable plate and is capable of rotating 360° about the excavator. A bucket or scoop is removably connected to the end of the articulated arm of the excavator.

According to other illustrative embodiments, the excavator comprises an elongated main frame having opposite top and bottom surfaces, opposite front and rear ends, and spaced apart elongated longitudinal sides. A second frame is fixedly connected to the main frame. A plate is slidably engaged with the second frame and is capable of sliding forward and backward in the longitudinal axis of the main frame. An operator's cabin is rotatably connected to the slidable plate and permits the cabin to rotate 360° about the excavator. The excavator further includes an articulated arm for digging into the earth. The articulated arm is connected to the main frame and is capable of rotating 360° about the excavator. A bucket or scoop is removably connected to the end of the articulated arm of the excavator. A pivotable dump bed is also removably connected to the movable frame for receiving materials from the digging bucket.

According to certain embodiments, the excavator comprises an elongated main frame having opposite front and rear ends and spaced apart elongated longitudinal sides. A plate having opposite facing top and bottom surfaces is slidably mounted on the top of the main frame and is capable of sliding forward and backward in the longitudinal direction of the main frame. A rotatable base rotatably mounted on the top surface of the slidable plate. An operator's cabin is rotatably mounted on top of the rotatable base and permits the cabin to rotate 360° about the excavator. The excavator further includes an articulated arm for digging into the earth. The articulated arm is connected to the base and is also capable of rotating 360° about the excavator. A bucket or scoop is removably connected to the end of the articulated arm of the excavator.

According to certain illustrative embodiments, the excavator comprises an elongated main frame having opposite front and rear ends and spaced apart elongated longitudinal sides. A plate having opposite facing top and bottom surfaces is slidably engaged with the main frame and is capable of sliding forward and backward in the long direction of the main frame. A rotatable base rotatably mounted to the top of the slidable plate. An operator's cabin is rotatably connected to the rotatable base and permits the cabin to rotate 360° about the excavator. The excavator further includes an articulated arm for digging into the earth. The articulated arm is connected to the base and is capable of rotating 360° about the excavator. A bucket or scoop is removably connected to the end of the articulated arm of the excavator. According to this embodiment, the excavator also includes a removable dump bed for receiving material from the bucket of the excavator. The dump bed is releasable or otherwise removable from the main frame.

According to other illustrative embodiments, the excavator comprises an elongated main frame having opposite top and bottom surfaces, opposite front and rear ends, and spaced apart elongated longitudinal sides. A second frame is fixedly mounted to the main frame. A plate having opposite facing top and bottom surfaces is slidably engaged with the second frame and is capable of sliding forward and backward in the long direction of the main frame. A rotatable base is rotatably mounted on top of the slidable plate. An operator's cabin is rotatably mounted on the top of the rotatable base and permits the cabin to rotate 360° about the excavator. The excavator further includes an articulated arm for digging into the earth. The articulated arm is connected to the base and is capable of rotating 360° about the excavator. A bucket or scoop is removably connected to the end of the articulated arm of the excavator.

According to other illustrative embodiments, the excavator comprises an elongated main frame having opposite top and bottom surfaces, opposite front and rear ends, and spaced apart longitudinal sides. A second frame is fixedly mounted on top of the main frame. A plate having opposite facing top and bottom surfaces is slidably engaged with the second frame and is capable of sliding forward and backward in the long direction of the main frame. A rotatable base rotatably mounted on the top of the slidable plate. An operator's cabin is rotatably mounted on top of the rotatable base and permits the cabin to rotate 360° about the excavator. The excavator further includes an articulated arm for digging into the earth. The articulated arm is connected rotatable base and is capable of rotating 360° about the excavator. A bucket or scoop is removably connected to the end of the articulated arm of the excavator. A dump bed is also removably connected to the movable frame.

The excavator includes an elongated substantially rectangular-shaped main frame with a front end, rear end, and spaced apart side rails. The main frame may also be referred to as the chassis of the excavator. The excavator includes a rotary base that is positioned above the main frame and is mounted on top of the main frame. The rotary base is mounted on, and is otherwise supported by, the underlying main frame of the excavator. An operator's cabin is mounted on top of the rotary base. One end of the boom of the articulated digging arm is pivotably mounted on the rotary base for rotational movement about a horizontal axis. One end of a stick is pivotally connected to the other end of the boom of the articulated digging arm. A bucket is pivotally connected to the free end of the stick for digging into the earth or for scooping up material resting on the surface of the earth.

The excavator includes a main frame or chassis upon which the other components of the excavator are mounted. The main frame comprises an elongated frame having a front end and a rear end, and opposite facing top and bottom surfaces. The main frame comprises a generally elongated and rectangular-shaped frame. A plate is slidingly engaged with the main frame of the excavator directly, or through a second frame that is mounted to the top of the main frame. A rotatable base is rotatably engaged with the sliding plate, and the operator's cabin and digging arm are mounted on the rotatable base. The slidable plate is able to slide both forward and backward within the boundaries of the second frame of the excavator. Due to the ability of the sliding plate to slide forward and backward along a portion of the longitudinal axis of the main frame of the excavator, the operator's cabin and the digging arm are able to also able to slide forward and backward with the sliding plate. The slide plate and operator's cabin are able to slide forward and backward in the direction of the longitudinal axis of the main frame of the excavator independent from the movement the underlying main frame of the excavator.

According to certain illustrative embodiments, a second frame is fixedly mounted to the top of the main frame. A slidable plate is slidably engaged with the second frame. The second frame includes spaced apart front and rear bars and spaced apart side rails positioned substantially in the same horizontal plane. The slidable plate is slidably engaged with the side rails of the second frame. According to certain embodiments, the slidable plate is engaged with side rails through tubes or sleeves that are coaxially positioned around the side rails of the second frame. The tubes are provided with a suitable inner diameter that is larger than the outer dimensions of side rails of the second frame to provide for a clearance gap between the outer dimensions of the side rails of the second frame and the inner diameter of tubes. The clearance gap between the side rails and tubes permits the slidable plate to slide or otherwise move back and forth in a horizontal place between the spaced apart front and rear bars of the second frame. The slidable plate includes opposite top and bottom surfaces, opposite front and rear edges, and opposite side edges. The plate also includes an opening communicating through the plate for passage of hydraulic fluid hoses and other cabling to operate the excavator. A hydraulic ram is positioned below the second frame and slidable plate, and is connected to rear bar of second frame and to the slidable plate by a suitable connection means such as hydraulic ram brackets. The hydraulic ram is used to move the slide plate forward and backward between the front bar and rear bar of the second frame.

A rotatable base is mounted on the top of the sliding plate. An operator's cabin is mounted on the top of the rotatable base. The slidable plate allows the weight of the operator's cabin of the excavator to shift forward and backward over the center of the tandem axle walking beam of the excavator, which acts as a fulcrum point. The slidable plate allows weight to be distributed where it needs to be in order to provide balance and stability to the excavator while performing various digging operations over rugged and uneven terrain, while still maintaining the ability of the cabin and digging arm to rotate 360° about the excavator.

The excavator includes an articulated digging arm that is also connected to the top of the rotatable base. The articulated digging arm includes a boom and a stick. The boom of the articulate arm includes opposite first and second ends. The first end of the boom of the articulated arm is pivotably connected to the rotatable base by a suitable connection means. The stick of the articulated arm also includes opposite first and second ends. The first end of the stick of the articulated arm is pivotably attached to the second end of the boom of the articulated arm at a pivot point. A bucket is pivotably and releasably attached to the second end of stick of the articulated arm. Hydraulic rams are used to raise and lower the boom, and to pivot the stick and the bucket of the excavator to perform digging operators and to facilitate transport of the excavator.

Mounted near the front of the main frame of the excavator is a front steering axle. The front steering axle is mounted to the bottom or underside of the main frame through the steering axle frame. Wheels or tires are mounted on the outside of the spaced apart side rails of the main frame and are attached to the front steering axle by ball joints for making the excavator mobile.

A tandem axle walking beam assembly is mounted near the rear end of the main frame of the excavator through one or more axle frame brackets. The axle frame brackets are fixedly connected to the spaced apart side rails of main frame. A drive axle is connected to the axle frame brackets. Walking beam axles are attached to the drive axle through axle hubs. The axle hubs that connect the walking beam axles to the drive axle may also house pivot and braking means. Sets of wheels or tires are mounted on the outside of walking beam axles.

According to other illustrative embodiments, the excavator comprises a main frame having a longitudinal axis that extends from the front end to the rear end of the main frame. A rotatable base is mounted to the main frame. An operator's cabin rotatably mounted on the rotatable base. While the rotatable base and cabin are capable of rotating 360°, the base is mounted in a stationary position on the main frame of the excavator and does not move along the longitudinal axis of the mainframe. An axle-walking beam assembly is movably mounted below the main frame. According to this alternative embodiment, the excavator further includes means for reciprocally moving the axle-walking beam assembly forward and backward in the direction of the longitudinal axis of the main frame. The means for reciprocally moving the tandem-axle-walking beam assembly may include, without limitation, one or more hydraulic rams or one or more actuators. The means for reciprocally moving the tandem axle-walking beam assembly are capable of moving the assembly to different locations in the direction of the longitudinal axis of the main frame of the excavator in order to distribute the weight of the excavator as needed. According to this embodiment, the excavator also includes an articulated digging arm and optionally a bucket removably connected to the articulated digging arm. The tandem axle-walking beam may include a drive axle connected to the main frame, walking beams connected to the drive axle, wheel axles connected to the walking beams; and wheels rotatably mounted on the wheel axles.

A blade assembly is movably attached to the main frame of the excavator and is used for grading and stability while digging with the rotating excavator. The power blade assembly includes a blade and at least one pivotable blade lift arm that is operated by a hydraulic ram to lift and lower the blade of the blade assembly. The hydraulic rams move blade up and down during an excavating operation. The power blade assembly also includes blade tilt control means to control the tilt of the power blade. The blade tilt control means is capable of tilting the blade in various angles in the same vertical plane. The blade assembly further includes blade angle control means for controlling the angle of the front face of the blade in the horizontal plane. The blade angle control means controls the angling of the blade from the neutral position, which is the position where the front face of the power blade is facing rearwardly in the longitudinal direction of the elongated main frame of the excavator. Through the use of hydraulic rams, pivotable arms and linkages, the blade angle control means can angle the front face of the power blade to face both to the left and right sides of the main frame of the excavator. As the power blade can be moved upwardly and downwardly in a vertical plane by the lift arm, and the blade can be tilted in various angles in the same vertical plane, and the front face of the blade can be angled to the left and right of the neutral position in relation to the main frame of the excavator, it can be referred to as a six-way motion blade assembly.

A dump bed is optionally mounted to the top of the main frame near of the front end of the excavator. Also mounted near the front end of the main frame of the excavator is a hoist for dump bed. The hoist for the dump bed is essentially a frame that is connected to the main frame of the excavator and the dump bed. Without limitation, and only by way of illustration, the hoist may comprise a substantially U-shaped dump bed hoist frame. The dump bed hoist frame may include spaced apart elongated legs that are connected at one of their ends by a connecting member. The dump bed hoist frame is hingedly connected to the front end of the main frame by dump bed hoist frame hinges. One or more hydraulic rams are connected to the dump bed hoist frame and the main frame of the excavator with hydraulic ram brackets. The hydraulic rams are used to extend upwardly the optional dump bed into dumping position during a dumping operation.

An extendable tow hitch may by extendably engaged with the main frame at the front end of the excavator. The extendable tow hitch comprises a frame having elongated and spaced apart legs. Each of the spaced apart legs of tow hitch have opposite first and second ends. The second ends of legs of tow hitch are connected near their ends by a cross-member. Extending outwardly in the same horizontal plane from cross-member are two arms that converge and are joined at a junction point. The cross-member and arms together form a triangular shape. Depending substantially downwardly from the junction point of the two arms is a flange member having opposite upper and lower ends. The lower end of the flange member terminates with a tow eye hook. The first ends of the legs of the tow hitch frame are free. The free ends of the legs of the tow hitch frame are inserted into the elongated spaced apart side rails of the main frame of the excavator. The free ends of the legs are attached to hydraulic rams that are also mounted within the main frame side rails by ram brackets. The tow hitch assembly remains in the retracted position with the legs of the tow hitch frame being inserted into the spaced apart legs of the main frame of the excavator until transport of the excavator is desired. When it is desired to transport the excavator to or from a construction jobsite, the hydraulic rams housed within the spaced apart side rails of the main frame of the excavator are used to extend the tow hitch.

According to any of the illustrative embodiments described herein, the excavator may utilize a track system, such as a track system driven by a motor and hydraulic rams, to impart mobility to the excavator as an alternative to the use of the walking beams and wheels.

The excavator will now be described in greater detail with reference to the drawing FIGURES. It should be noted that the excavator is not intended to be limited to the illustrative embodiments shown in the drawing FIGURES.

FIG. shows a side view of an illustrative embodiment of revolving hydraulic excavator 1. Excavator 1 includes an operator's cabin 2 mounted on top of the mainframe 4 that is capable of rotating 360° in both directions about the excavator. Attached to the operator's cabin 2, is a counterweight 3 for balancing the cabin 2 and a motor compartment 3a for housing the motor of the excavator 1.

Still referring to FIG. 1, excavator 1 includes main frame 4. Main frame 4 is an elongated frame having a front end 5 and a rear end 6 and opposite facing top 7 and bottom 8 surfaces. A second frame 9 is fixedly connected to the top surface 7 of the main frame 4. A slidable plate (not shown in FIG. 1) is slidably engaged with second frame 9. Rotatable base 10 is rotatably connected to the bottom wall of the operator's cabin 2 and the slidable plate. Main frame 4 is a mobile frame and includes a plurality of wheels that are engaged with main frame 4 through axles.

Still referring to FIG. 1, excavator 1 includes an articulated arm 11 that is connected to rotatable base 10. Articulated arm 11 includes a boom 12 and a stick 13. The boom 12 of the articulated arm 11 includes opposite first 14 and second 15 ends. The first end 14 of the boom 12 of the articulated arm 11 is pivotably connected to the rotatable base 10 by a suitable connection means. The stick 13 of the articulated arm 11 includes opposite first 16 and second 17 ends. The first end 16 of the stick 13 of articulated arm 11 is pivotably attached to the second end 15 of the boom 12 of the articulated arm 11 at pivot point 18. Bucket 19 is pivotably attached to the second end 17 of stick 13 of articulated arm 11.

Excavator 1 further includes dump bed 20. Dump bed 20 is removably engaged with the top surface 7 of the main frame 4 of the hydraulic excavator 1. Excavator 1 also includes blade assembly 55 and tow hitch 22.

FIG. 2 shows a side view of the excavator 1 with the operator's cabin 2 in a rear facing position. The operator's cabin 2 and the articulated digging arm 11 have been rotated 180° from the forward facing front position. The boom 12 of the articulated digging arm 11 has been extended beyond the rear of the excavator 1. The stick 13 of the articulated digging arm 11 has been pivoted to a position that is substantially perpendicular to the ground surface. The digging bucket 19 is shown resting on the ground.

Figure 3:
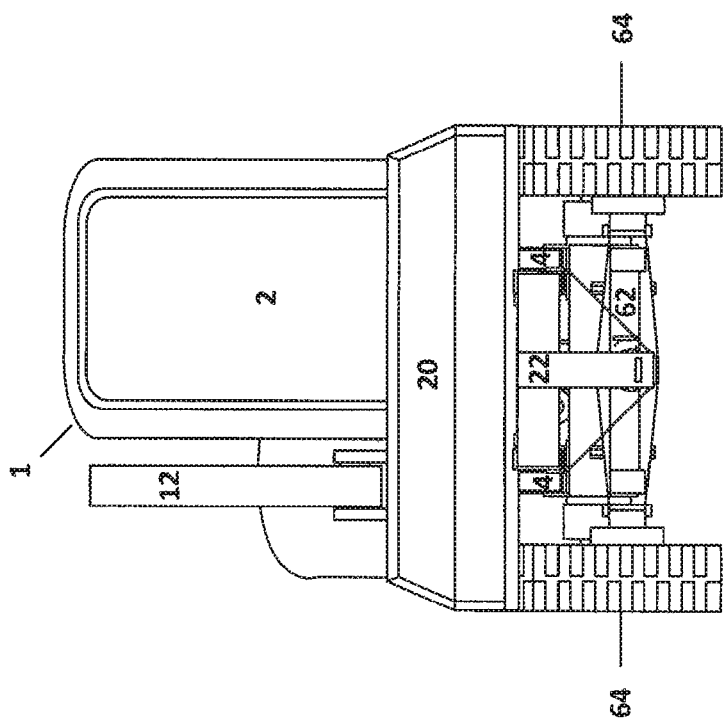
FIG. 3 is a front view of the illustrative embodiment of the excavator shown in FIG. 1.

FIG. 3 shows a front view of the excavator 1. Operator's cabin 2 is mounted on top of the rotatable base 10. The boom 12 and stick 13 of the articulate digging arm 11 have been retracted and second end of the stick 13 rests upon the top of the rotating base 10. Dump bed 20 is mounted on top of the main frame 4 of the excavator 1. A set of wheels 64 are positioned on opposite sides of the main frame 4 of the excavator 1 and are attached to steering axle 62.

FIG. 4 shows a front view of the excavator 1. Operator's cabin 2, motor compartment 3 and counterweight 3a are mounted on top of rotatable base 10. Rotatable base 10 is mounted on top of slidable plate 27. Wheels 88, 90 are mounted to drive axle 85. Power blade 55 is mounted to the main frame 4 of the excavator and extends beyond the wheels 88, 90.

Figure 5B:
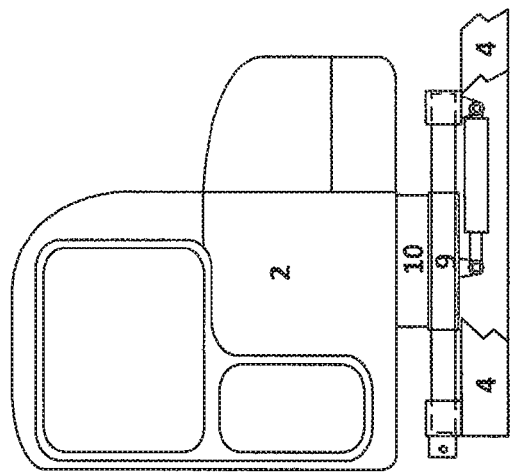
FIGS. 5A and 5B are front and side views of the operator's cabin of the excavator.
Figure 5C:
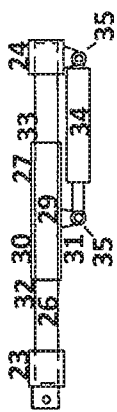
FIG. 5C is a side view of the second frame of the excavator.
Figure 5A:
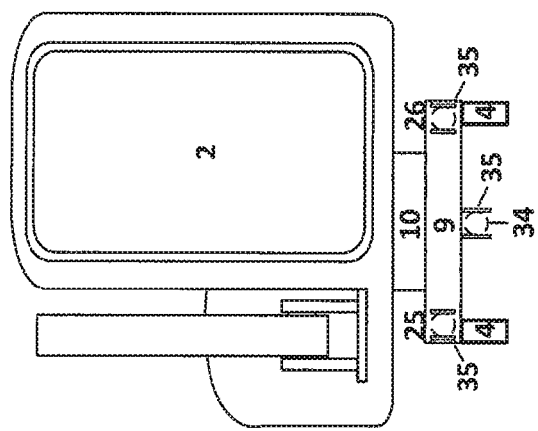

FIG. 5A shows a front view of the operator's cabin 2 mounted on top of the rotatable base 10 and second frame 9. FIG. 5B shows a side view of the operator's cabin 2 mounted on top of the rotatable base 10 and second frame 9. As shown in FIGS. 5A and 5B, second frame 9 includes spaced apart front 23 and rear 24 bars and spaced apart side rails 25, 26. Slidable plate 27 is slidably engaged with the side rails 25, 26 of the second frame 9. Slidable plate 27 includes opposite top 30 and bottom 31 surfaces and opposite front 32 and rear 33 edges. Hydraulic ram 34 is positioned below second frame 9 and slidable plate 27, and is connected to rear bar 24 of second frame 9 and to the front edge 32 of slidable plate 27 by a suitable connection means such as hydraulic ram brackets 35. Slidable plate 27 is connected to rotatable base 10, and slidable plate 27 and rotatable base move the operator's cabin forward and backward between the front 23 and rear 24 frame bars of the second frame 9. The slidable plate 27 is able to slide forward and backwards along a portion of the main frame 4 within the boundary established by the front bar 23 and rear bar 24 of the second frame 9. Thus, the slidable plate, rotatable base 10, and the operator's cabin 2 can move together forward and backward in the direction of the longitudinal axis of the main frame 4 of the excavator 1.

FIG. 6 shows a side view of excavator 1. The operator's cabin 2 of excavator 1 has been rotated 90° to face the side of the excavator 1. Operator's cabin is mounted on rotary base 10. In turn, rotary base 10 is mounted on the weight slide frame 9. The weight slide frame 9 is fixedly mounted to the underlying main frame 4 of the excavator 1. Near the front end 5 of main frame 4 is mounted a dump bed 20. Tow hitch assembly 22 is extendably mounted at the front end 5 of the main frame 4. Mounted to the main frame 4 near the rear end 6 of frame 4 is the power blade 55. Power blade 55 is mounted to the frame 4 by blade lift arm 56. Power blade 55 is shown in a downwardly position by power blade ram 51.

FIGS. 7A and 7B show an illustrative embodiment of the second frame 9 of the excavator 1. Second frame 9 includes spaced apart front 23 and rear 24 bars and spaced apart side rails 25, 26. According to the illustrative embodiment shown in FIG. 7, slidable plate 27 is slidably engaged with the side rails 25, 26 of the second frame 9. Slidable plate 27 may be engaged with side rails 25, 26 through tubes 28, 29. Tube 28 is coaxially positioned around side rail 25 and tube 29 is coaxially positioned around side rail 26. Tubes 28, 29 are provided with a suitable inner diameter that is larger than the outer dimensions of side rails 25, 26 to provide for a clearance gap between the outer dimensions of side rails 25, 26 and the inner diameter of tubes 28, 29. The clearance gap between the side rails 25, 26 and tubes 28, 29 permit the slidable plate 27 to slide or otherwise move back and forth between the spaced apart front 23 and rear 24 bars of the second frame 9 along the side rails 25, 26. Slidable plate 27 includes opposite top 30 and bottom 31 surfaces and opposite front 32 and rear 33 edges. Hydraulic ram 34 is positioned below second frame 9 and slidable plate 27, and is connected to rear bar 24 of second frame 9 and to the front edge 32 of slidable plate 27 by a suitable connection means such as hydraulic ram brackets 35. Hydraulic ram 34 is capable of moving slide plate 27 forward and backward between the front bar 23 and rear bar 24 of second frame 9. Slidable plate 27 is connected to rotatable base 10, which includes opening 36 for passing of hydraulic fluid hosing and cabling requirement to operate the excavator 1. The slidable plate 27 allows the weight of the operator's cabin 2 of the excavator 1 to shift forward and backward over the center of the tandem axle walking beam, which acts as a fulcrum point. The slidable plate 27 allows weight to be distributed where it needs to be in order to perform various digging operations with the excavator 1. The ability to distribute the weight of the operator's cabin 2 of the excavator also permits the excavator 1 to be towed with the need for transporting the excavator with a trailer.

FIG. 7C shows the operator's cabin 2 of the excavator 1 mounted on top of rotatable base 10 (also known as the slew ring or turret). The rotatable turret 10 is mounted on top of the slide plate 27 (not shown), which is reciprocally engaged with second frame 9. Second frame 9 is mounted on main frame 4. A hydraulic ram is engages with the slidable plate and the second frame 9 to move the slidable forward and backward in the longitudinal direction of the main frame 4 of the excavator 1.

Figure 8:
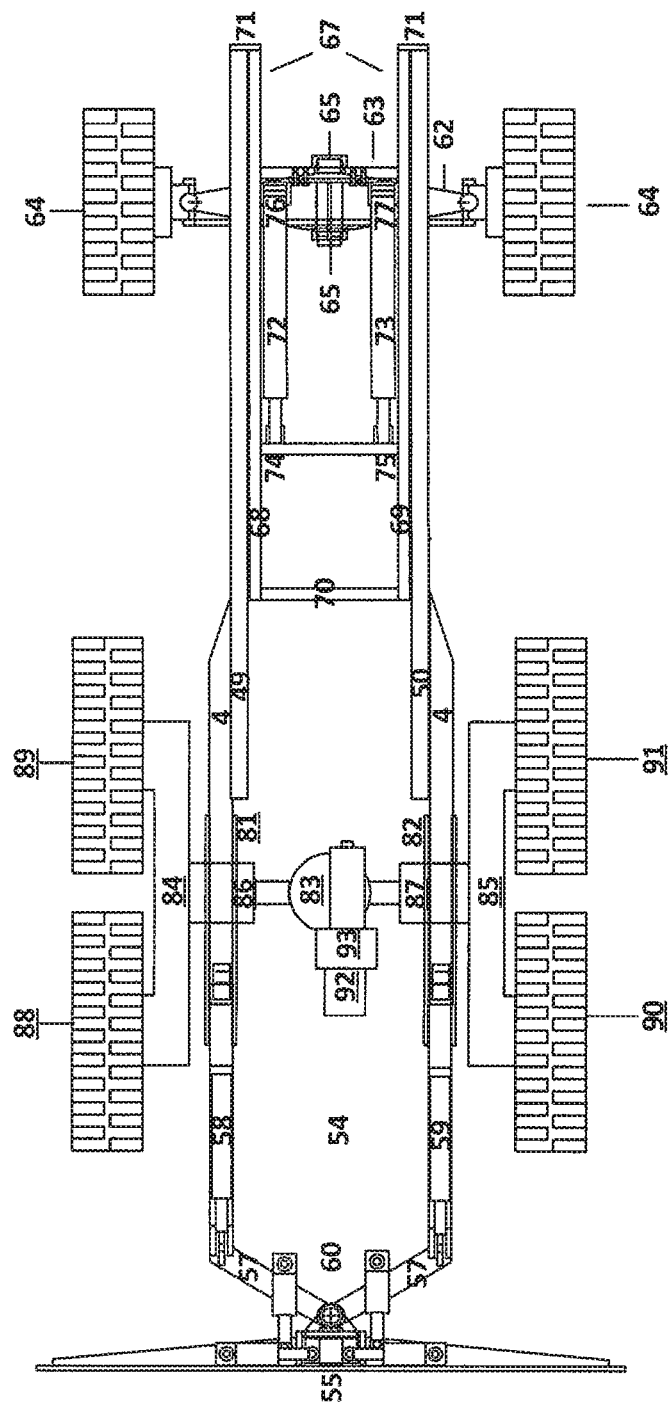
FIG. 8 is a top plan view of the illustrative embodiment of the excavator shown in FIG. 1 without showing the operator's cabin, slide plate assembly and optional dump bed.

FIG. 8 shows a top plan view of the illustrative embodiment of the excavator shown in FIG. 1 without showing the operator's cabin, slide plate assembly, or optional dump bed. The front end 5 of the main frame 4 includes wheels 64 that are engaged with the mainframe through front steering axle 62. Wheels 64 are mounted on each side of the spaced apart main frame 4 side rails 49, 50 of frame 4 and are attached to the steering axle 62 by ball joints 65. Dump bed hoist frame comprises a U-shaped dump bed hoist frame 67. Dump bed hoist frame 67 includes dump bed hoist legs 68, 69 which are connected by connecting member 70. Dump bed hoist frame 67 is hingedly connected to the front end of main frame 4 by dump bed hoist frame hinges 71. Hydraulic rams 72, 73 are connected to the dump bed hoist frame 67 with ram brackets 74, 75, and to main frame 4 with ram brackets 76, 77. Still referring to FIG. 8, a tandem axle walking beam assembly 80 is mounted near the rear end 6 of main frame 4 through axle frame brackets 81, 82. Axle frame brackets 81, 82 are fixedly connected to the main frame 4. Drive axle 83 is connected to axle frame brackets 81, 82. Walking beam axles 84, 85 are attached to the drive axle 83 through axle hubs 86, 87. Axle hubs 86, 87 house pivot and braking means. Axle hubs 86, 87 permits walking beam axles 84, 85 to move up and down to follow the contour of the ground below being traversed by the excavator 1. Wheels 88, 89 are mounted on the outside of walking beam 84 by wheel axles. Wheels 90, 91 are mounting on the outside of walking beam axle 85 by wheel axles. Hydraulic motor 92 and transmission power and drive main drive axle 93. Power blade assembly 55 is mounted at the rear end 6 of the excavator 1.

Figure 9:
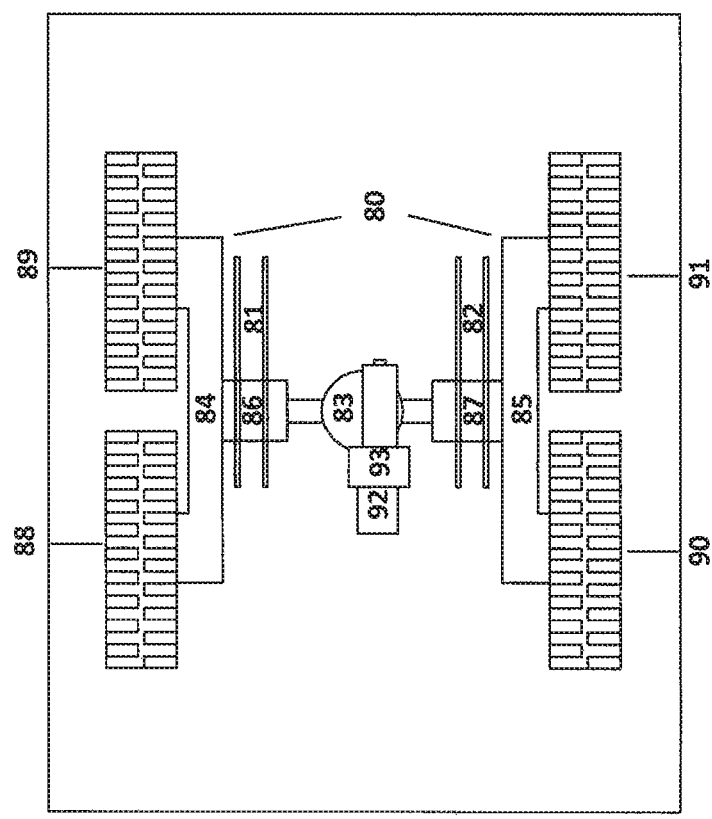
FIG. 9 is a fragmentary top plan view of the tandem axle-walking beam assembly of the illustrative embodiment of the excavator shown in FIG. 1 without the operator's cabin mounted to the frame.

FIG. 9 shows a fragmentary top view of the rear end of the excavator 1. A tandem axle walking beam assembly 80 is mounted near the rear end of main frame 4 through axle frame brackets 81, 82. Axle frame brackets 81, 82 are fixedly connected to spaced apart side rails 49, 50 of main frame 4. Drive axle 83 is connected to axle frame brackets 81, 82. Walking beam axles 84, 85 are attached to the drive axle 83 through axle hubs 86, 87. Axle hubs 86, 87 house pivot and braking means. Axle hubs 86, 87 permits walking beam axles 84, 85 to move up and down to follow the contour of the ground below being traversed by the excavator 1. Wheels 88, 89 are mounted on the outside of walking beam axle 84. Wheels 90, 91 are mounting on the outside of walking beam axle 85. Hydraulic motor 92 and transmission power and drive main drive axle 93.

Figure 10:
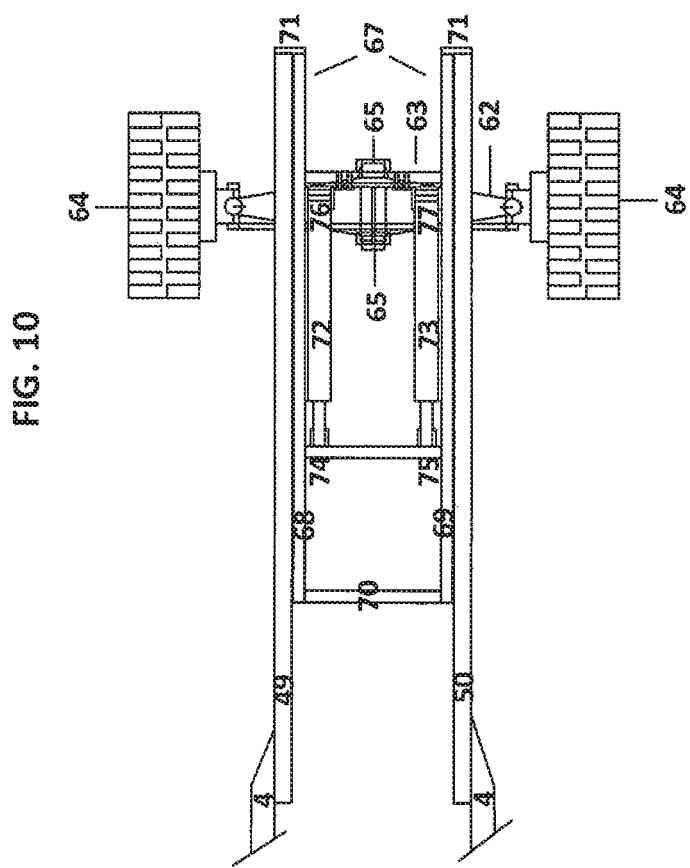
FIG. 10 is a fragmentary top plan view of the front portion of the illustrative embodiment of the excavator shown in FIG. 1 without the optional dump bed mounted on the frame.
Figure 11A:
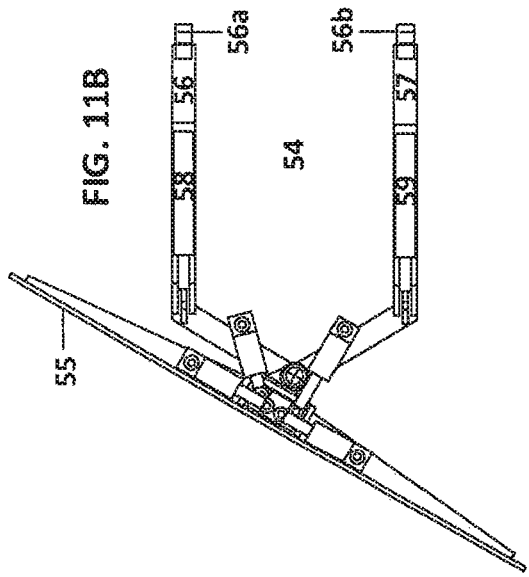
FIGS. 11A-11B are top views of the power blade assembly of the excavator.
Figure 11B:
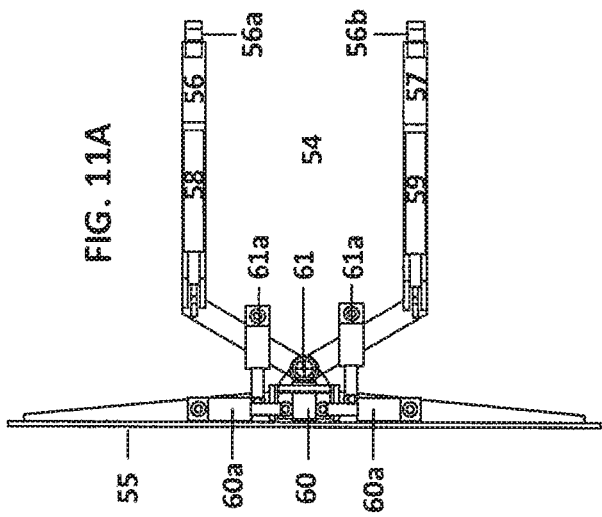
Figure 11C:
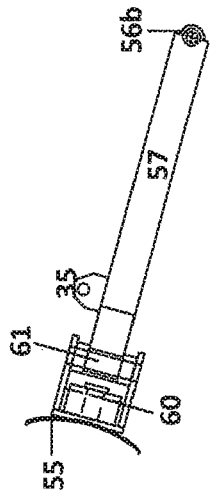
FIGS. 11C and 11D are side views of the power blade assembly of the excavator in both the lifted and lowered positions.
Figure 11D:
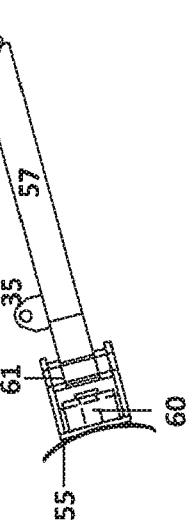

FIG. 10 is fragmentary top view of the front end of the excavator 1. Front steering axle 62 is mounted near the front end of main frame 4 through steering axle frame 63. Wheels 64 are mounted on each side of the spaced apart main frame side rails 49, 50 of frame 4 and are attached to the axle 62 by ball joints 65. Also mounted near the front end of the main frame 4 of the excavator 1 is the dump bed hoist frame for dump bed 20. Dump bed hoist frame 67 comprises a U-shaped dump bed hoist frame 67. Dump bed hoist frame 67 includes dump bed hoist legs 68, 69 which are connected by connecting member 70. Dump bed hoist frame 67 is hingedly connected to the front end of main frame 4 by dump bed hoist frame hinges 71. Hydraulic rams 72, 73 are connected to the dump bed hoist frame 67 with ram brackets 74, 75, and to main frame 4 with ram brackets 76, 77.

FIG. 11A-11D show an illustrative embodiment of a power blade assembly 54 for grading operations. Power blade assembly 54 is connected at the rear of the main frame 4 of excavator 1. Blade arms 56, 57 are attached to brackets 81, 82 at pivot points 56a, 57a. Power blade assembly 54 includes blade 55 attached to blade lift arms 56, 57. Hydraulic rams 58, 59 are connected to blade lift arms 56, 57. Hydraulic rams 58, 59 move blade 55 up and down during an excavating operation or during transport of the excavator 1. Power blade assembly 54 also includes blade tilt control means 60. Blade tilt control means 60 include hydraulic rams 60a, 60b and is capable of tilting the blade 55 at various angles from the neutral position (the neutral position is a position that is substantially horizontal to the ground) in the same vertical plane. Blade assembly 54 further includes blade angle control means 61. Blade angle control means 61 includes hydraulic rams 61a, 61b and controls the angling of the blade 55 to the left side and right side of the neutral position (the neutral position is the position where the blade 56 faces substantially rearwardly of the mainframe 4). The power blade 55 can be referred to as a six-way motion blade as it is able to move up and down, tilt at different angles in the same vertical plane, and angle to the left and right of the neutral position. Hydraulic ram bracket 35 is used to connect a hydraulic ram between the blade assembly 55 and the excavator 1.

Figure 12A:
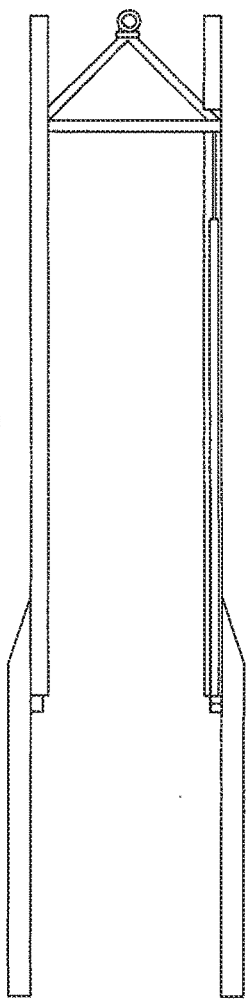
FIG. 12A is top view of the tow hitch assembly of the excavator in the fully retracted position.
Figure 12B:
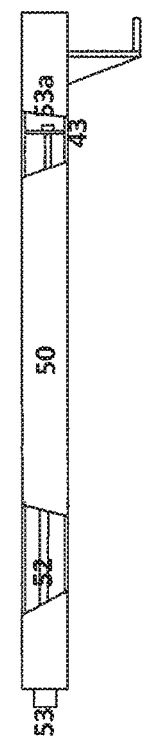
FIG. 12B is a side view of the tow hitch assembly of the excavator in the fully retracted position.
Figure 12C:
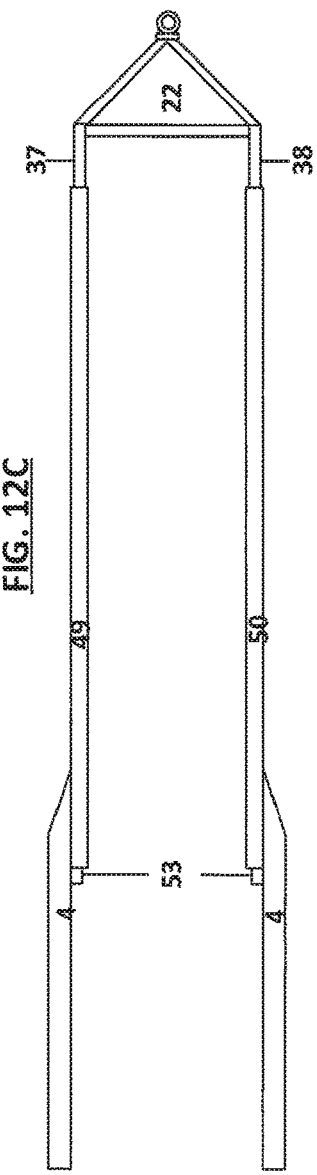
FIG. 12C is top view of the tow hitch assembly of the excavator in a partially extended position.
Figure 12D:
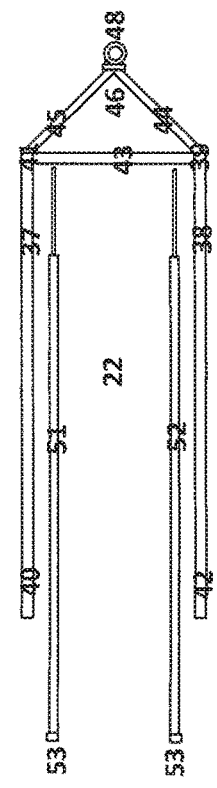
FIG. 12D is a side view of the tow hitch assembly of the excavator in the partially extended position.
Figure 12E:
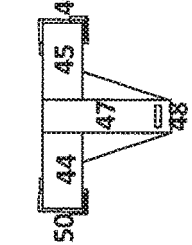
FIG. 12E is an end view of the tow hitch assembly of the excavator.

FIGS. 12A and 12B are top view of the extendable tow hitch 22. Extendable tow hitch 22 comprises a frame having elongated and spaced apart legs 37, 38. Each of legs 37, 38 of tow hitch 22 have opposite ends 39-42. Ends 39, 41 of legs 37, 38 of tow hitch 22 are connected near one end by cross-member 43. Extending outwardly from cross-member 43 in the same plane are arms 44, 45 that are joined at junction point 46. The opposite ends 40, 42 of tow hitch legs 37, 38 are free. Now referring to FIG. 12C, the tow hitch 22 is extendably engaged with the main frame 4 of the excavator 1. Main frame 4 includes spaced apart and elongated side rails 49, 50. The free ends 40, 42 of tow hitch legs 37, 38 are inserted into, and are housed within, the elongated spaced apart side rails 49, 50 of the main frame 4. The hydraulic rams 51, 52 are used to extend and retract the tow hitch 22 from the main frame 4. Hydraulic rams 51, 51 are attached to cross-member 43 at attachment points 53a. The other ends of the hydraulic rams 51, 52 are attached to main frame 4. Referring to FIG. 12E, depending substantially downwardly from junction point 46 is flange member 47. Flange member 47 has opposite upper and lower ends. Tow eye hook 48 is attached to the lower end of the flange member 47.

Figure 13A:
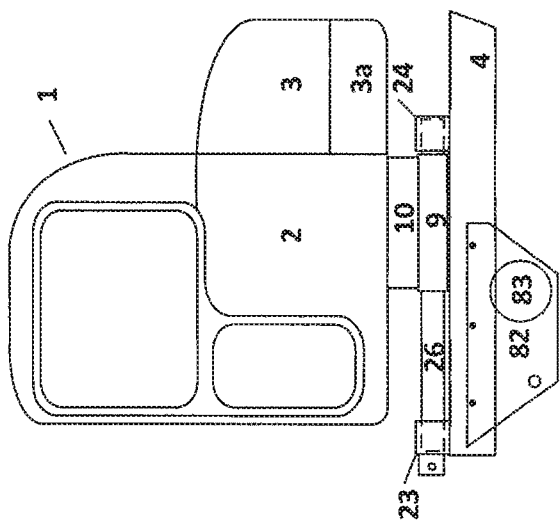
FIG. 13A-13C are partial side views of an illustrative embodiment of the excavator with the operator's cabin positioned in different positions on the slidable plate member.
Figure 13B:
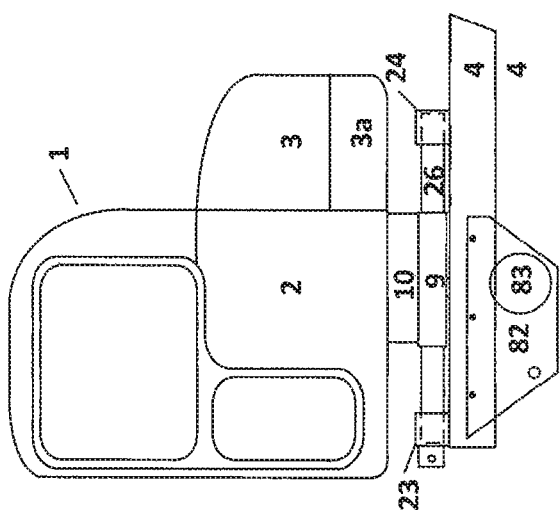
Figure 13C:
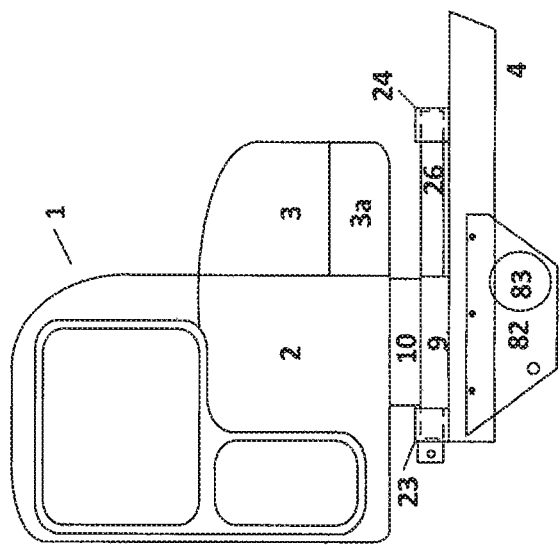

FIGS. 13A-13C show partial side views of the excavator 1. Excavator includes operator's cabin 2, motor compartment 3, and counterweight 3a. The operator's cabin 2 of the excavator 1 mounted on top of rotatable base 10 (also known as the slew ring or turret). The rotatable turret 10 is mounted on top of the slide plate 27 (not shown), which is reciprocally engaged with second frame 9. Second frame 9, which includes front bar member 23, rear bar member 24 and side rail 26, is mounted on main frame 4. Axle bracket 82 is connected to the side of main frame 4 and drive axle 83 is mounted to the main frame 4 through the axle bracket 82. FIG. 13B shows the operator's cabin 2 in the neutral position with the weight of the cabin 2 positioned over the center of the drive axle 83. FIG. 13A shows the operator's cabin 2 with the weight of the cabin 2 shifted rearwardly of the center of the drive axle 83 toward the rear end 6 of the excavator 1. FIG. 13C shows the operator's cabin 2 with the weight of the cabin 2 shifted forwardly of the center of the drive axle 83 toward the front end 5 of the excavator 1.

Figure 14:
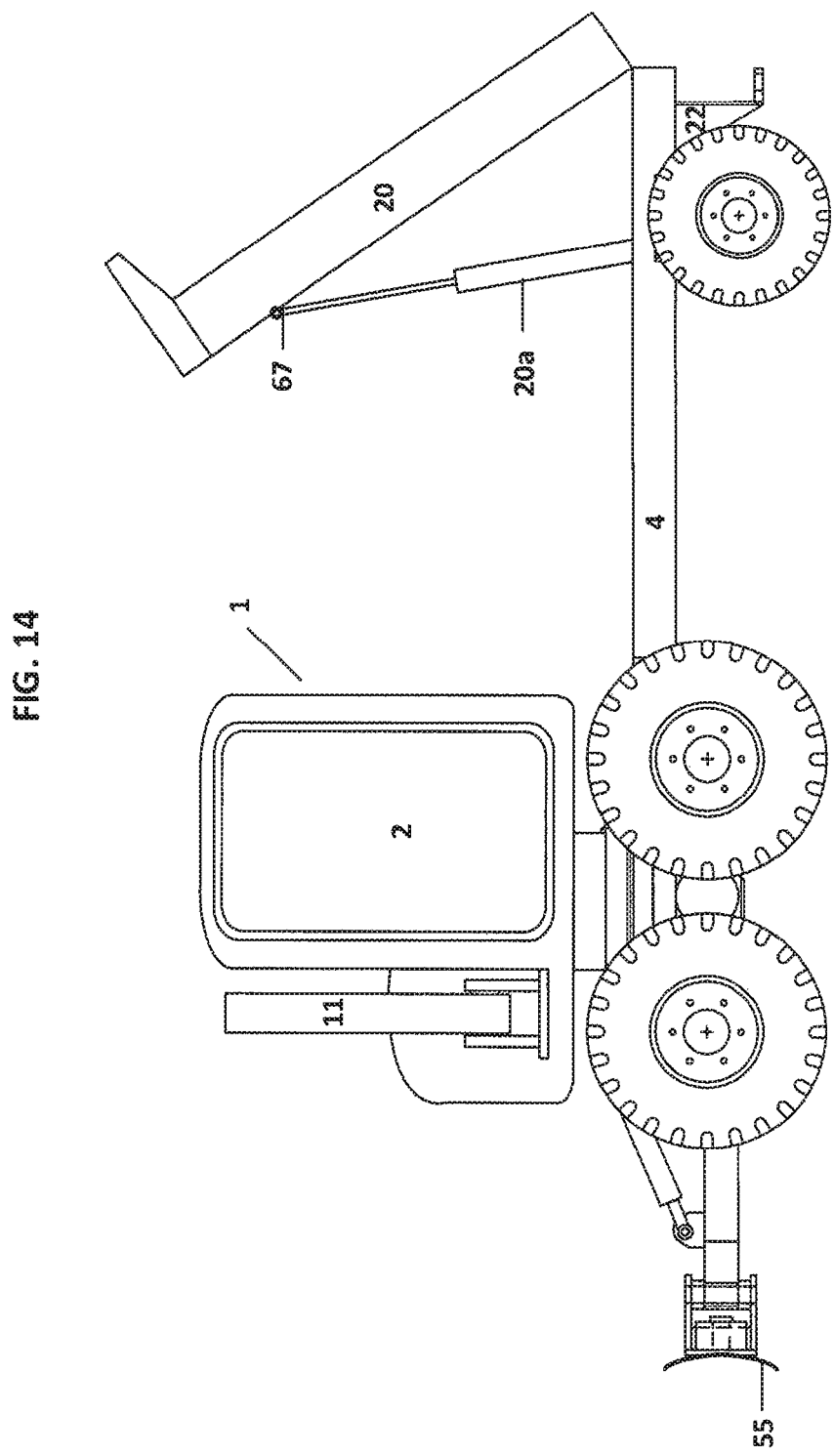
FIG. 14 is a side view of the illustrative embodiment of the excavator shown in FIG. 1 with the optional dump bed shown in the dumping position.

FIG. 14 shows a side view of the illustrative embodiment of the excavator 1 shown in FIG. 1 with the optional dump bed 20 shown in the dumping position. Dump bed 20 has been raised into dumping position by hydraulic ram 20a that is connected to dump bed hoist frame 67. To hitch 22 is shown in the fully retracted position within its legs positioned within the main frame 4. Operator's cabin 2 and articulated digging arm 11 have been rotated 90° to face the side of the excavator 1. Power blade assembly 55 is shown in the neutral position.

Figure 15:
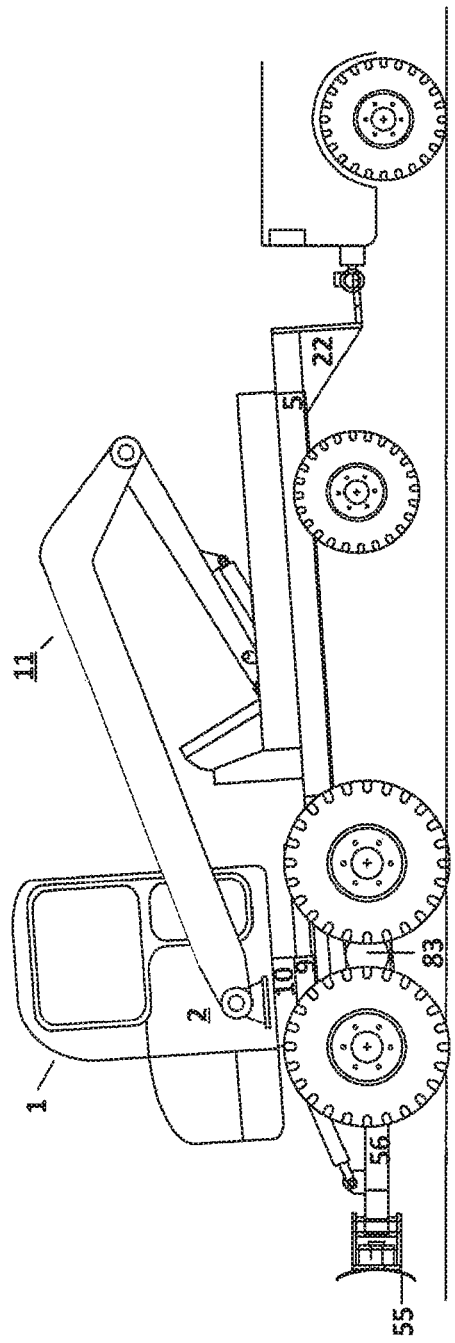
FIG. 15 is a side view of the illustrative embodiment of the excavator shown in FIG. 1 with weight of the operator's cabin distributed for transporting, digging arm resting in the dump bed, and tow hitch attached to a vehicle for transporting the excavator to or from a construction jobsite.

FIG. 15 is a side view of the illustrative embodiment of the excavator shown in FIG. 1 with weight of the operator's cabin distributed for transporting the excavator. Using the slidable plate 27, the weight of the operator's cabin 2 has been shifted backward toward the rear end 6 of the excavator 1 such that the weight of the cabin 2 is shifted rearward of the drive axle 83. This shifting of the weight raises the front end 5 and wheels 64 of the excavator 1 off of the ground for transport. The power blade assembly 55 with blade 56 is shown raised off of the ground and in the neutral position for transport. The articulated digging arm 11 resting in the dump bed 20, and tow hitch 22 attached to a vehicle for transporting the excavator 1 to or from a construction jobsite.

Figure 16B:
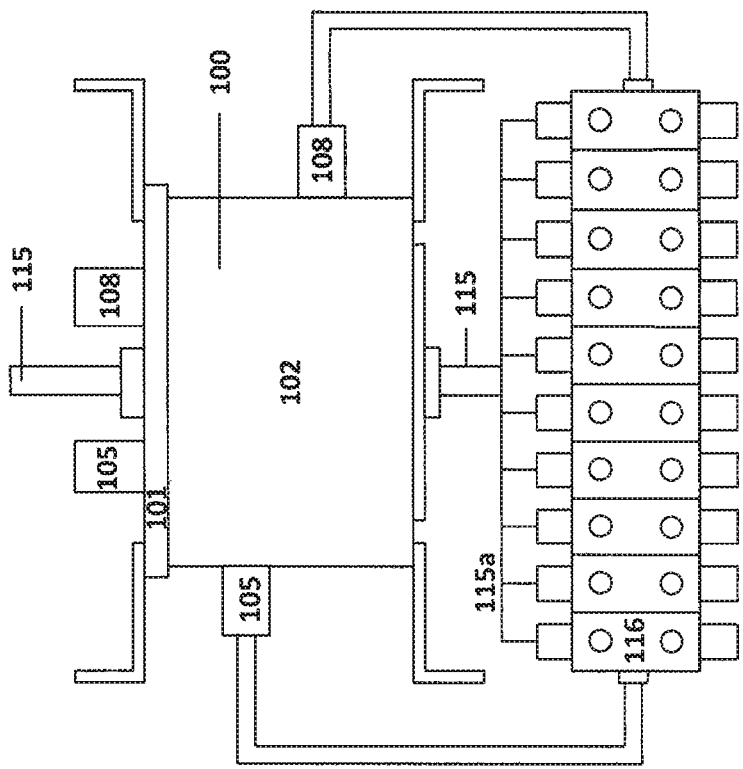
FIGS. 16A and 16B are cross-sectional views of the slide ring assembly of the excavator.
Figure 16A:
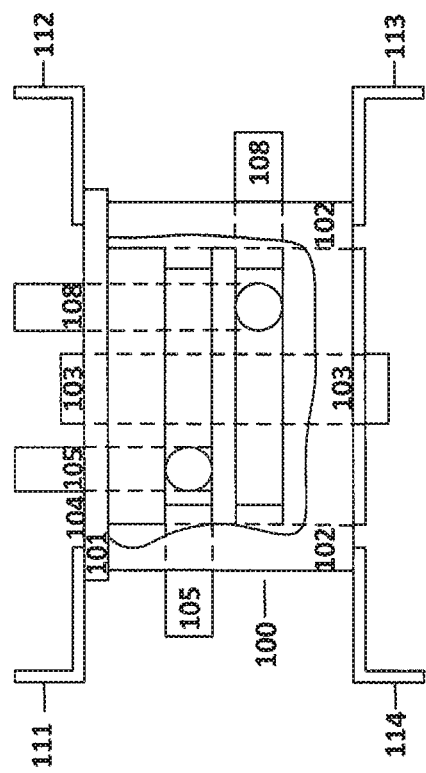

FIGS. 16A and 16B show cross sectional views of the slip ring assembly 100. Slip ring 100 is connected to and is positioned within a generally circular opening passing through the thickness of the rotatable base 10 of the excavator 1. Slip ring assembly 100 includes a top stationary portion 101 and a bottom rotatable portion 102 that is in fluid communication with top stationary portion 101. Top stationary portion 101 is fixedly connected to the rotatable base 10 with connectors 111, 112 and rotates with base 10. Bottom portion 102 of the slip ring assembly 100 is connected to the slide plate 27 through connectors 113, 114. According to the embodiment shown in FIGS. 16A and 16B, bottom portion 102 is rotatable independently of top portion 101 and rotatable base 10. The top surface 104 of top portion 101 includes an inlet 105 for receiving hydraulic fluid from a source of hydraulic fluid for operating the various functionality of the excavator 1. Inlet 105 includes suitable coupling or connection means for connecting the top portion 101 of the slip assembly 100 to conduit delivering hydraulic fluid from a hydraulic fluid source to the assembly 100. The top surface 104 of top portion 101 includes an outlet 108 for receiving used hydraulic fluid and removing it from the slip ring assembly 100. Outlet 108 includes suitable coupling or connection means for connecting the top portion 101 of the slip assembly 100 to conduit 110 returning used hydraulic fluid. An elongated passageway 103 acting as a cable and hosing run is centrally disposed and passes through top 101 and bottom 102 portions of the slip ring assembly 100. Hydraulic hosing 115 delivers hydraulic fluid from above the rotatable base 10, via a plurality of hydraulic fluid hosing branches 115a, to a valve bank 116 positioned below the slip ring assembly 100. The illustrative embodiment shown in the FIG. 16B shows a bank of 10 valves. However, this is merely an illustrative embodiments and the valve bank may include any number of valves depending on the number of implements on the excavator that need to be operated.

Figure 17B:
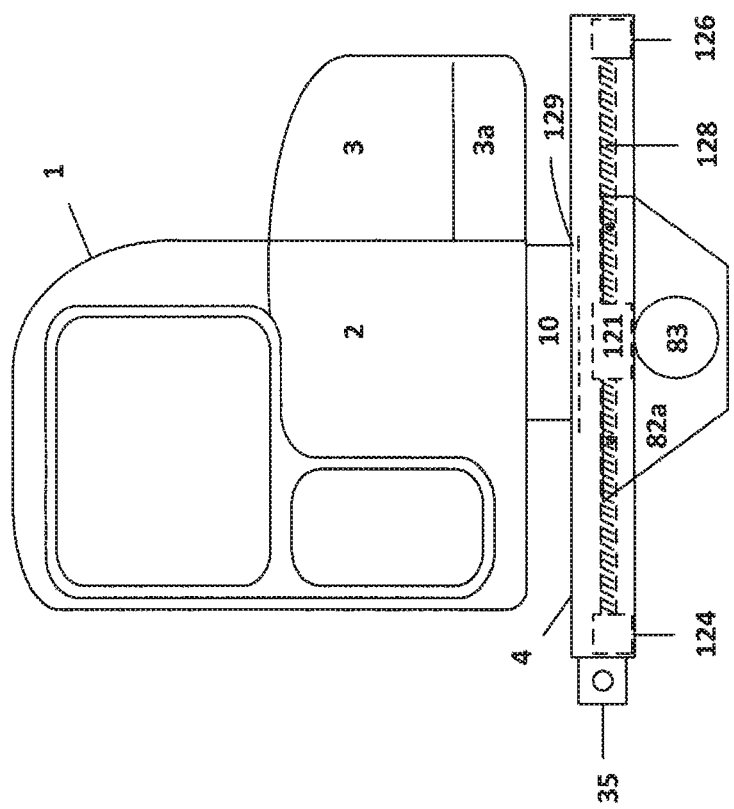
FIG. 17B is a side with of the operator's cabin mounted on the movable tandem axle-walking beam assembly of FIG. 17A.
Figure 17A:
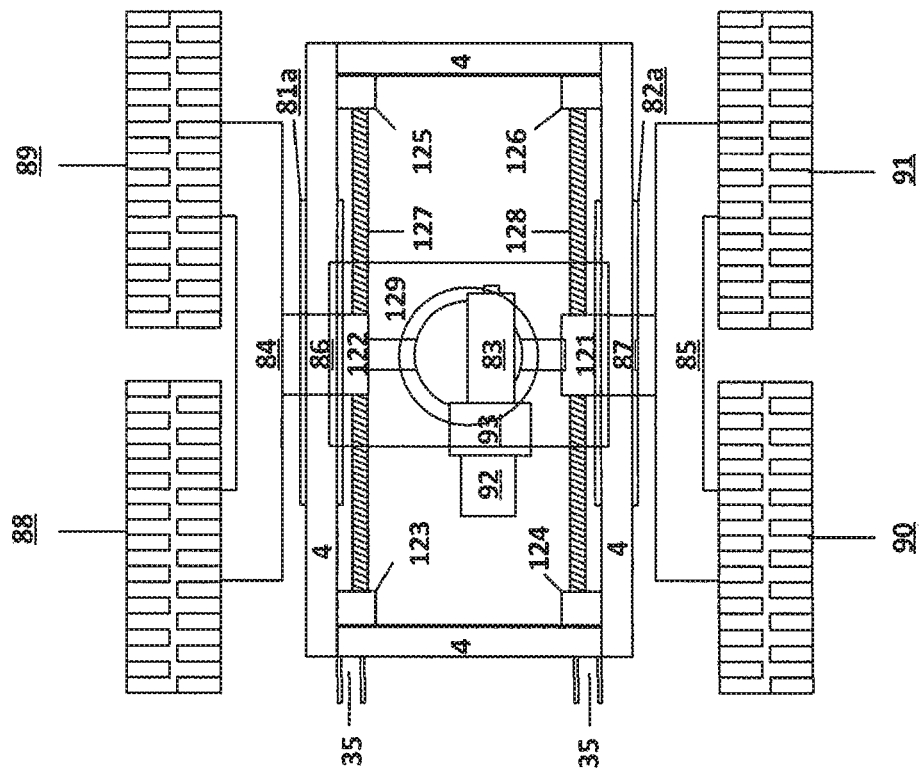
FIG. 17A is a top view of an illustrative embodiment of the tandem axle-walking beam assembly movably engaged with the main frame.

FIG. 17A is a top view of an illustrative embodiment of the tandem axle-walking beam assembly movably engaged with the main frame. FIG. 18A shows a fragmentary top view of the rear end of the excavator 1. A tandem axle walking beam assembly is movably mounted on main frame 4 through axle frame slide channels 81a, 82a. Axle frame slide channels 81a, 82a are fixedly connected to spaced apart side rails of main frame 4. Drive axle 83 is connected to axle frame slide channels 81a, 82a. Walking beam axles 84, 85 are attached to the drive axle 83 through axle hubs 86, 87. Axle hubs 86, 87 house pivot and braking means. Axle hubs 86, 87 permits walking beam axles 84, 85 to move up and down to follow the contour of the ground below being traversed by the excavator 1. Wheels 88, 89 are mounted on the outside of walking beam axle 84. Wheels 90, 91 are mounting on the outside of walking beam axle 85. Hydraulic motor 92 and transmission 93 power and drive main drive axle 83. Linear actuator screw blocks 121, 122 are engaged with axle slide channels 81a, 82a. Linear actuator screws 127, 128 are engaged with screw blocks 121, 122, screw bearings 123, 124, and gear motor 125, 126. FIG. 17B is a side with of the operator's cabin mounted on the movable tandem axle-walking beam assembly of FIG. 17A. FIG. 17B shows the operator's cabin 2 in the neutral position with drive axle 83 located below the center of the cabin 2. In this position, the weight of the cabin 2 is positioned over the center of the drive axle 83. Operator's cabin 2 is mounted on rotatable base 10. Rotatable base 10 is mounted on plate 129. Plate 129 is mounted to main frame 4 in a stationary position. The tandem axle walking beam assembly is driven by the linear actuator and can move in the direction of the longitudinal axis of the main frame. The plate 129 is mounted in a fixed position on the main frame and operator's cabin 2, while being able to rotate 360°, cannot translate forward and backward in the direction of the longitudinal axis of the excavator.

FIG. 18A-18C are partial side views of an illustrative embodiment of the excavator with the operator's cabin mounted on the main frame of the excavator with the movable tandem axle-walking beam assembly positioned in different positions along the longitudinal axis of the main frame. Excavator includes operator's cabin 2, motor compartment 3, and counterweight 3a. The operator's cabin 2 of the excavator 1 is mounted on top of rotatable base 10 (also known as the slew ring or turret). The rotatable turret 10 is mounted on top of the main frame 4. Axle bracket 82 is connected to the side of main frame 4 and drive axle 83 is mounted to the main frame 4 through the axle bracket 82. According to the embodiment of the excavator 1 shown in FIGS. 18A-18C, an actuator is used to move the tandem axle-walking beam assembly forward and backward along the longitudinal axis of the excavator 1. FIG. 18B shows the operator's cabin 2 in the neutral position with drive axle 83 located below the center of the cabin 2. In this position, the weight of the cabin 2 is positioned over the center of the drive axle 83. The actuator includes linear actuator screw block 121, actuator screw bearing 124, actuator gar motor 126 and linear actuator screw 128. FIGS. 18A and 18C show the tandem axle walking beam assembly moved to a position by the linear actuator to a position both forwardly and rearwardly of the operator's cabin 2 of the excavator 1.

While the excavator has been described in connection with various illustrative embodiments, it is to be understood that other similar embodiments may be used or modifications and additions may be made to the described embodiments for performing the same function disclosed herein without deviating therefrom. The embodiments described above are not necessarily in the alternative, as various embodiments may be combined to provide the desired characteristics. Therefore, the excavator should not be limited to any single embodiment, but rather construed in breadth and scope in accordance with the recitation of the appended claims.

The invention claimed is:

1. An excavator comprising:
   a main frame having a longitudinal axis;
   a cabin rotatably mounted on the top of said main frame;
   an articulated digging arm;
   a bucket removably connected to said articulated digging arm;
   a drive axle connected to said main frame;
   walking beams connected to said drive axle;
   wheel axles connected to said walking beams and;
   wheels rotatably mounted on said wheel axles.

2. The excavator of claim 1, further comprising a dump bed hingedly connected to said main frame; and wheels mounted on each side of the main frame by a steering axle near the front of the main frame.

3. The excavator of claim 1, wherein said cabin is connected to said main frame by a rotatable base.

4. The excavator of claim 2, wherein said digging arm comprises an articulated arm comprising a boom and a stick.

5. The excavator of claim 2, comprising a blade connected to said main frame.

6. The excavator of claim 2, further comprising a tow hitch extendably connected to said main frame.

7. The excavator of claim 4, wherein said articulated digging arm is rotatably mounted on said main frame, wherein said articulated digging arm is capable of rotating 360° about the excavator and resting in said dump bed.

8. The excavator of claim 5, further comprising a blade connected to said main frame, wherein said blade is able to move up and down, tilt at different angles in the same vertical plane, and angle to the left and right.

9. An excavator comprising:
   a main frame having a longitudinal axis;
   a rotatable base mounted on main frame;
   a cabin mounted on said rotatable base;
   an axle-walking beam assembly movably mounted below said main frame;
   a tow hitch extendably connected to said main frame;
   a dump bed hingedly connected to said main frame;
   an articulated digging arm; and a bucket removably connected to said articulate digging arm.

* * * * *